US005596911A

United States Patent [19]

Panttila

[11] Patent Number: 5,596,911
[45] Date of Patent: Jan. 28, 1997

[54] DRIVE GEAR FOR A GROUP OF CYLINDERS AND METHOD IN THE DRIVE OF CYLINDERS

[75] Inventor: Väinö Panttila, Jyväskylä, Finland

[73] Assignee: Valmet Power Transmission Inc., Jyvaskyla, Finland

[21] Appl. No.: 394,638

[22] Filed: Feb. 27, 1995

[30] Foreign Application Priority Data

Sep. 12, 1994 [FI] Finland .................................. 944209

[51] Int. Cl.$^6$ ................................................. F16H 37/06
[52] U.S. Cl. ................................... 74/665 GA; 403/359; 29/893.1; 74/606 R
[58] Field of Search ...................... 74/665 GA, 665 D, 74/665 B, 665 A, 665 F, 665 S, 606 R; 403/359; 29/893.1

[56] References Cited

U.S. PATENT DOCUMENTS 4,181,039 1/1980 Phelps ................... 74/665 GA
4,597,310 7/1986 Panttila ................... 74/665 GA

FOREIGN PATENT DOCUMENTS

2817106 11/1978 Germany .
514799 10/1971 Switzerland .

Primary Examiner—Vinh T. Luong
Assistant Examiner—Saul Rodriguez
Attorney, Agent, or Firm—Steinberg, Raskin & Davidson, P.C.

[57] ABSTRACT

A drive gear for a group of cylinders and a method in the drive of cylinders in which the drive gear has a box frame including a front plate, a rear plate, and side plates, and to which box frame, rotational drive is introduced from outside the gearbox through a shaft. Rotation of the shaft causes rotation of a cogwheel and further, two other cogwheels are rotated which are in contact with this cogwheel, and the drive is transferred to both sides of the gearbox and further to the cylinders. The box frame of the gearbox is stationarily supported on a foundation which receives the weight of the gearbox shafts and cogwheels and the weight of the box frame. The load arising from the weight of the gearbox is transferred to the foundation through the box frame of the gearbox. Two cylinders and their shafts can be operated so that, between the shafts and the gearbox, there is a floating coupling which permits certain angular changes for the shafts of the driven cylinders. In this manner, torsion arising from faults in the directions of the shafts is not transferred from the cylinders to the gearbox or from the gearbox to the cylinders.

20 Claims, 6 Drawing Sheets

DRIVE GEAR FOR A GROUP OF CYLINDERS AND METHOD IN THE DRIVE OF CYLINDERS

BACKGROUND OF THE INVENTION

The present invention relates to a drive gear for a group of cylinders and a method for driving cylinders.

In the prior art, transmission apparatus for a group of drying cylinders, e.g., used in a dryer section of a paper machine, are known in which the drive is introduced into the middle of a box frame of the gearbox and is distributed from a middle cogwheel in the gearbox to additional cogwheels on both sides of the gearbox and then to the related cylinders. In the prior art gearbox apparatus, cylindrical cogwheels rest on each of the driven shafts of the cylinders, as a result of which, any faults of deflection of the shafts etc. that may occur in the operation of the cylinders produce a distortion in the contact between the teeth of the cogwheel. This contact results in damage to the cogwheels in the drives of the drying cylinders.

OBJECTS AND SUMMARY OF THE INVENTION

It is an object of the present invention to provide a new and improved gearbox and method for driving cylinders in which torsion arising from faults in directions of the shafts of the cylinders is not transferred from the cylinders to the gearbox or from the gearbox to the cylinders.

To achieve this object and others, in the present invention, a gearbox apparatus of a novel type is described, in which the drive for the drying cylinders is taken from the middle of the gearbox and is distributed conventionally via engaging cogwheels to both sides of the gearbox and thus to two cylinders. However, in the invention, the box frame of the gearbox is stationarily supported on a foundation. Further, in accordance with the invention, there is a so-called floating connection or floating coupling between the gearbox and each driven cylinder shaft. In view of this construction, any positioning inaccuracies and flaws that may occur in the rotation drive are not transferred from the drying cylinders to the gearbox or from the gearbox to the drying cylinders. Rather, the apparatus in accordance with the invention permits a reliable and oscillation-free drive of drying cylinders.

In the cylinder-group drive gear or gearbox in accordance with the invention, a box frame of the gearbox is supported stationarily on the foundation, the foundation receiving the weight of the gearbox shafts and cogwheels and the weight of the box frame, while the load arising from the weight of the gearbox is transferred to the foundation through the box frame of the gearbox. Two cylinders and their shafts are operated so that, between the shafts and the gearbox, there is a floating coupling which permits certain angular changes for the shafts of the driven cylinders, i.e., changes in the angle between the axis of the shafts of the cylinders and the gearbox, in which case torsion arising from faults in the directions of the shafts is not transferred from the cylinders to the gearbox or from the gearbox to the cylinders.

In the method in accordance with the invention in a cylinder drive, the rotation drive is introduced from the motor or other drive means to the gearbox and distributed from the gearbox to a pair of cylinders. The gearbox is in this drive, supported on the foundation, and the cylinders are supported from their bearings separately on the foundation and coupled with the gearbox from their shafts by means of floating couplings. Faults of deflection and shift are permitted for the shafts of the cylinders without torsion or strains being produced on the gearbox.

The invention will be described in the following with reference to some preferred embodiments of the invention shown in the accompanying drawings. However, the invention is not confined to the illustrated embodiments alone.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
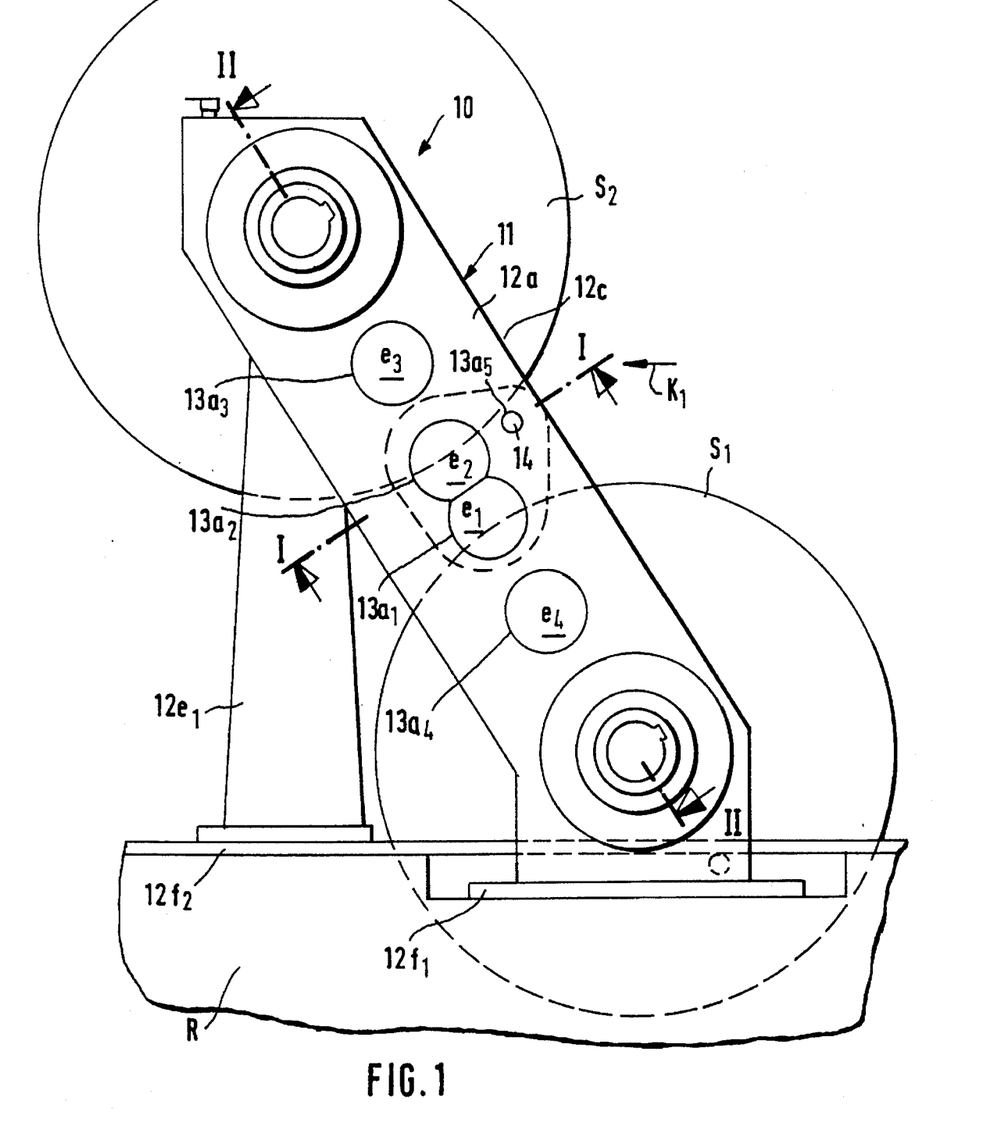
FIG. 1 is a side view of a gearbox in accordance with the invention and used in a method in accordance with the invention.

Referring to the drawings wherein like reference numerals refer to the same elements, FIG. 1 shows the inventive gearbox 10 viewed in the direction perpendicular to the machine direction. The gearbox 10 comprises a box frame 11, which comprises a front plate 12a, a rear plate 12b (FIG. 2), and side plates 12c. A space D defined by the box frame 11 in its interior is filled with oil wist. The gearbox also comprises a fastening plate $12f_1$ on which the box frame 11 of the gearbox is supported since the plate $12f_1$ rests on a foundation R. The foundation R receives the weight of the gearbox shafts and cogwheels as well as the weight of the box frame itself. Thus, the load arising from the weight of the gearbox 10 is transferred to the foundation R through the box frame 11. As shown in FIG. 1, cylinders $S_1$ and $S_2$ are drying cylinders, and the gearbox is supported on the foundation R of the line of drying cylinders while connecting means, e.g., a screw $12g_1$, secures the box frame 11 to the foundation R through the plate $12f_1$ (FIG. 2).

The gearbox in accordance with the invention is preferably intended for use as a drive gear for the drying cylinders in a group of drying cylinders in a line of drying cylinders in a paper or board machine. However, it is understood that the inventive gearbox may be used as drive gear for any type of rotating cylinders.

As shown in FIG. 1, the gearbox 10 comprises the box frame 11, whose front plate 12a and rear plate 12b include lead-in openings $13a_1$, $13a_2$, . . . through the front and rear plates for the journallings and the drive apparatus. To the lead-in openings, covers $e_1$, $e_2$, . . . can be attached. Rotational drive is passed into the interior of the box construction of the gearbox through an input shaft 14 and through an opening $13a_5$ formed in the front plate $12a$ of the gearbox 11.

Figure 2:
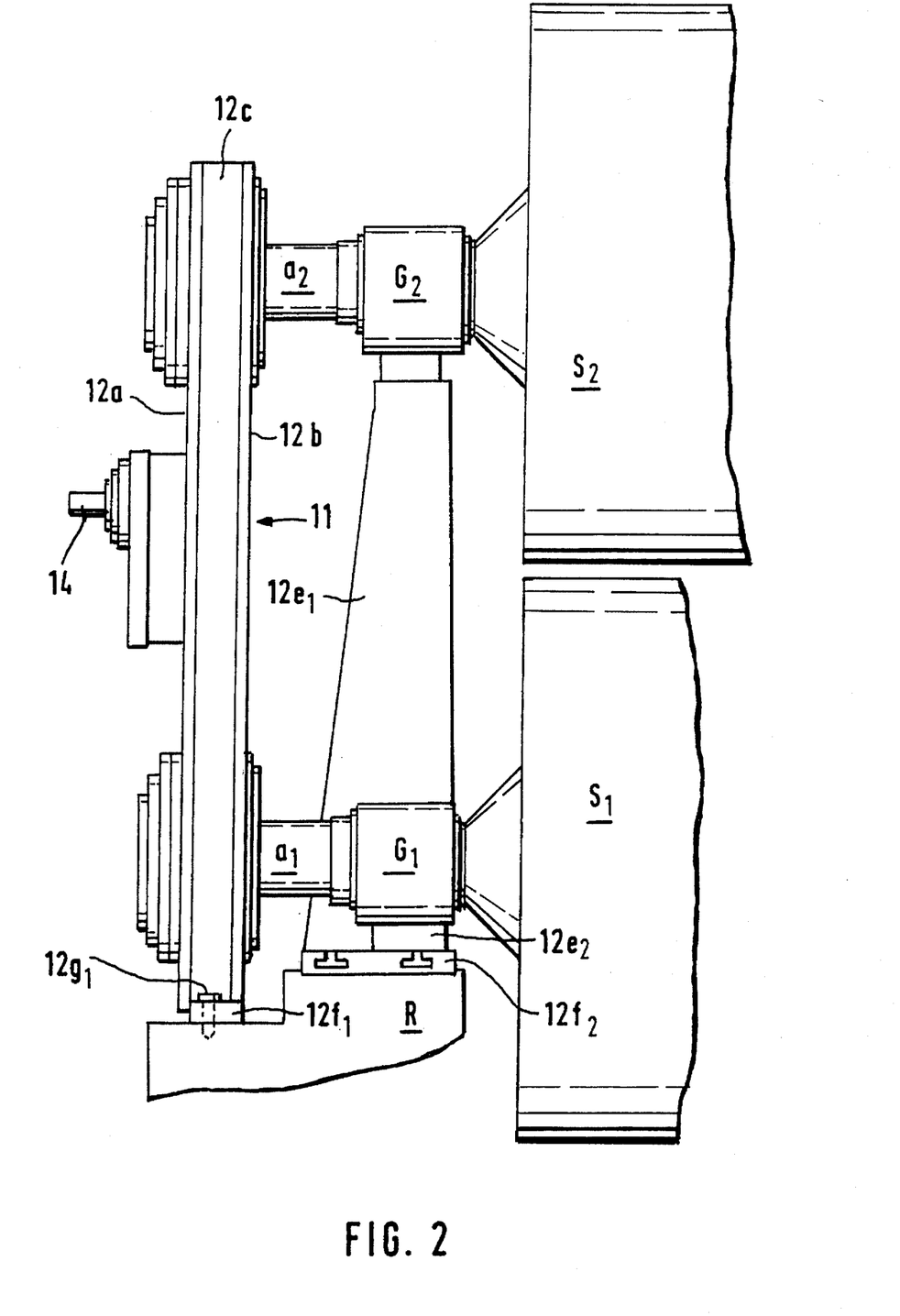
FIG. 2 shows the gearbox of FIG. 1 viewed in the direction of the arrow $K_1$.

As shown in FIG. 2, the box frame 11 of the gearbox is supported on the bottom plate $12f_1$. The plate $12f_1$ is fixed to the foundation R by means of a detachable screw joint or other suitable fastening means. The screw joint is denoted by reference $12g_1$ in FIG. 2. The bearings $G_1$ and $G_2$ of the cylinders $S_1$ and $S_2$ rest on support of the foundation R. The bearing $G_2$ of an uppermost one of cylinder $S_2$ is supported on a support beam $12e_1$ and further, via the bottom plate $12f_2$, on the foundation R. The bearing $G_1$ of a lower cylinder $S_1$ is supported on a support beam $12e_2$ and further, via this beam, on the foundation R. The weight of the cylinders $S_1$, $S_2$ is thus transferred through the bearings $G_1$ and $G_2$ and through the support beams $12e_1$ and $12e_2$ to the foundation R.

Figure 3:
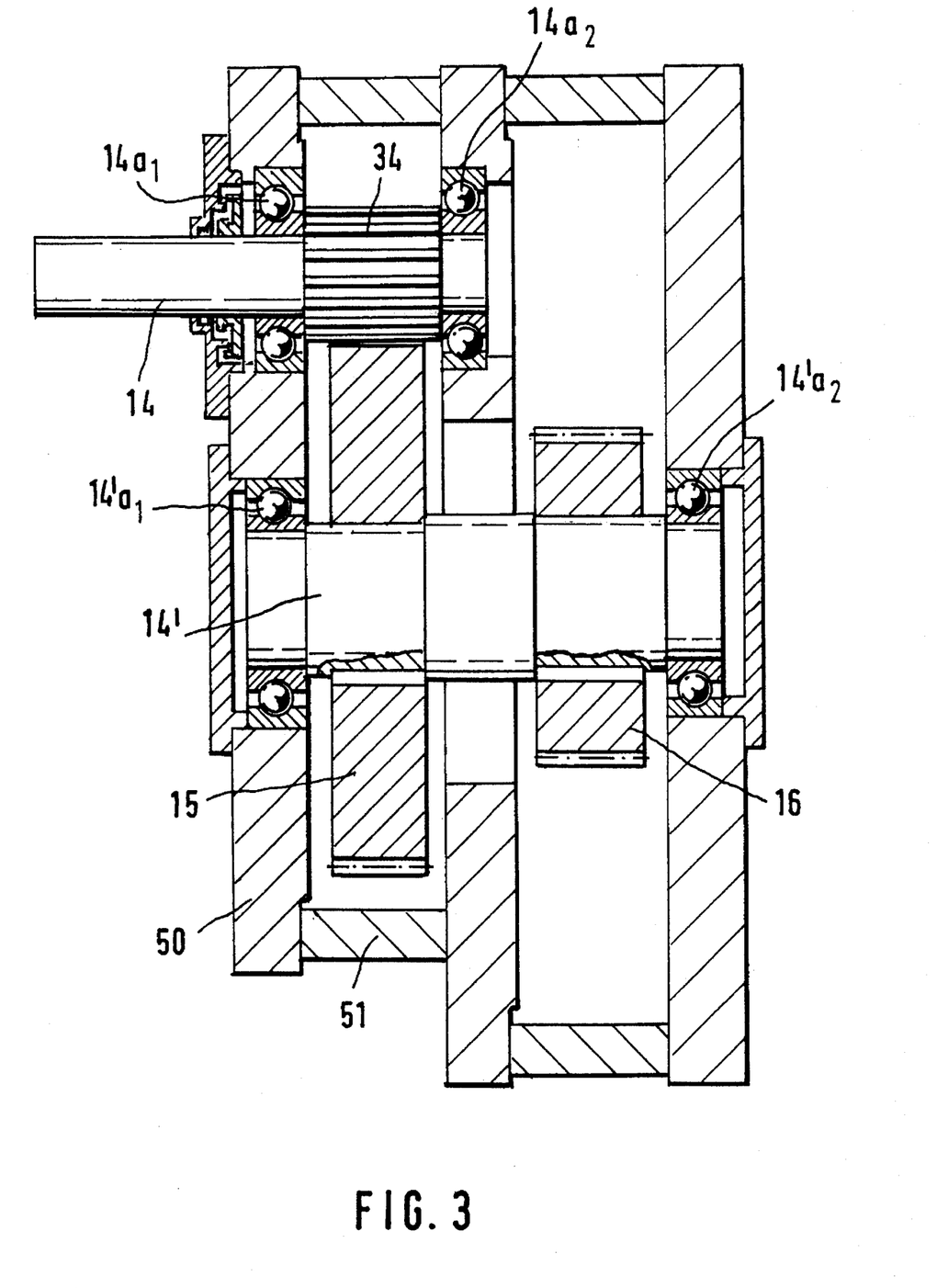
FIG. 3 is a sectional view taken along the line I—I in FIG. 1.

FIG. 3 is a sectional view taken along the line I—I in FIG. 1. The rotational drive is passed from the motor or other conventional drive means (not shown) to the shaft 14. The shaft 14 is provided with a cogwheel 34, preferably fixedly connected thereto, from which the drive is transferred to a cogwheel 15, i.e. via the toothed arrangement of teeth on cogwheel 34 and teeth on cogwheel 15. Cogwheel 15 is mounted on a shaft 14' at one end, i.e., its front end in relation to the input of the drive. The drive is transferred from the shaft 14' to a cogwheel 16 mounted at the other end of the shaft. To house the cogwheels 34,15, from the side 12 of the gearbox housing, a side box 50,51 projects, by whose means a suitable space is formed for enclosing the cogwheels 34 and 15. In this side box, shaft 14 is mounted for rotation by means of bearings $14a_1$ and $14a_2$. Shaft $14a'$ is mounted for rotation by means of bearings $14'a_1$ and $14'a_2$.

Figure 4:
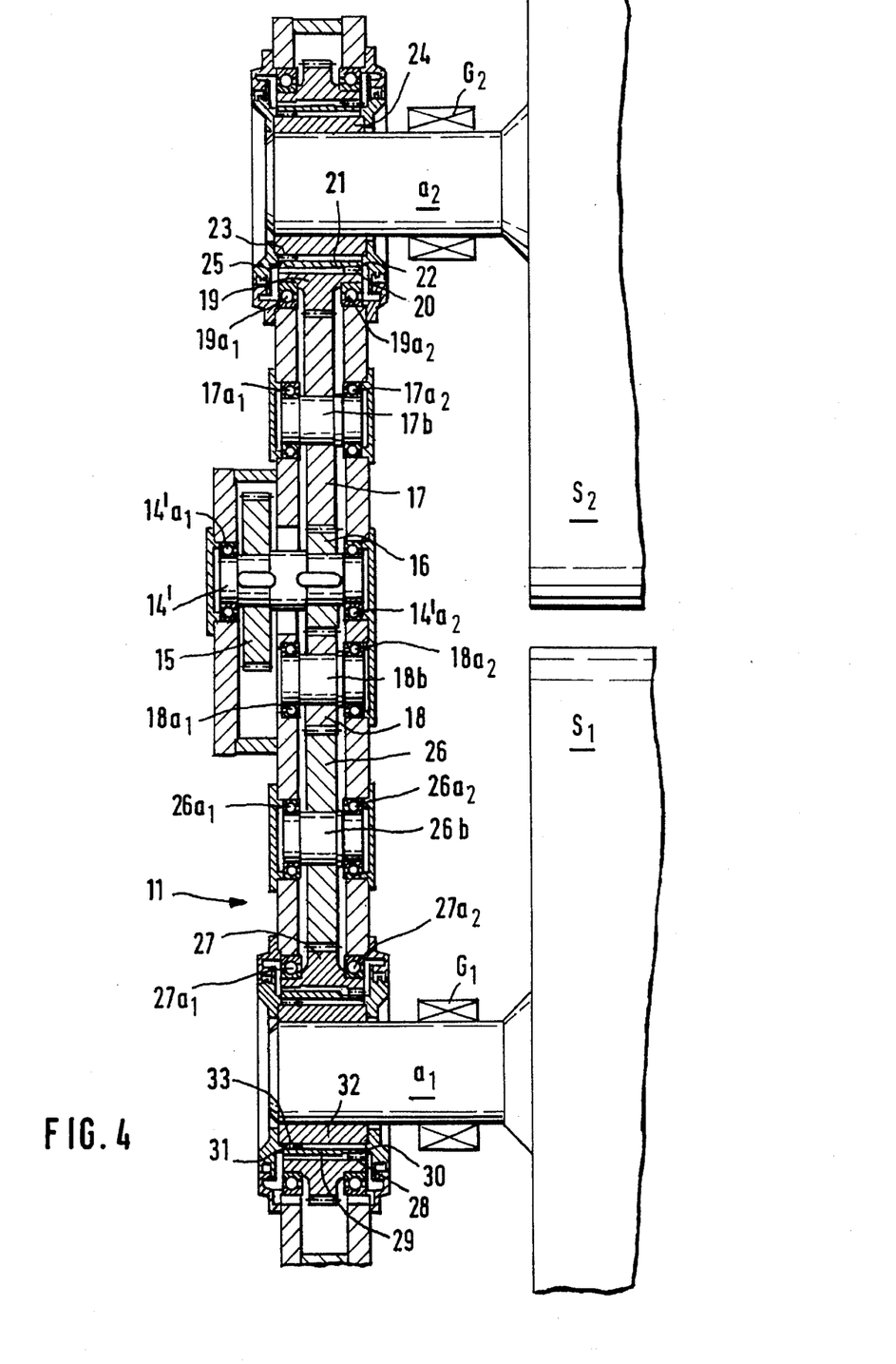
FIG. 4 is a sectional view taken along the line II—II in FIG. 1.

FIG. 4 is a sectional view taken along the line II—II in FIG. 1. From the cogwheel 16, the drive is transferred further to the cogwheels 17 and 18 in contact with cogwheel 16. Thus, in the gearbox, the drive is distributed from cogwheel 16 to two sides, i.e., to two branch drives. From cogwheel 16, the drive is transferred to the upper cylinder $S_2$ via the cogwheel 17. Cogwheel 17 is in contact with, i.e., engages, cogwheel 19 surrounding a shaft $a_2$ of the cylinder $S_2$. Cogwheel 19 comprises inner grooves or teeth 20, i.e., arranged on an inner surface thereof, which are in contact with and engage the grooves or teeth 22 on an intermediate bushing 21 situated in the hollow interior of cogwheel 19. The recitation of grooves or teeth on a surface, here and as follows, means that the surface has alternating projections and recesses relative to the projections whereby the recesses can be either grooves or spaces between teeth and the projections can be either teeth or the ungrooved, unchanneled portions between grooves. The intermediate bushing 21 comprises inner grooves or teeth 23, i.e., on an inner surface thereof, which are in contact with outer grooves or teeth 25 provided on a drive ring 24 connected with shaft $a_2$ of the drying cylinder $S_2$. The drive ring 24 is situated within the hollow interior of the intermediate bushing 21 and is stationarily mounted, e.g. by means of a key and/or press fitting, on the shaft $a_2$ of the drying cylinder $S_2$. By means of the intermediate bushing 21, an adequate radial play is formed. The transfer of torque takes place in operation from the gearbox to the shaft $a_2$ of cylinder $S_2$ reliably irrespective of any angular faults that the shaft $a_2$ may be subjected to during its operation. Thus, by means of this drive with an intermediate bushing, a so-called floating coupling between the shaft $s_2$ of the drying cylinder $S_2$ and the gearbox 10 is accomplished.

The shaft of the cogwheel 17 is denoted with $17b$, and its bearings which support the shaft $17b$ for rotation are denoted by reference numerals $17a_1$ and $17a_2$. The cogwheel 19 is mounted for rotation by means of bearings $19a_1$ and $19a_2$.

The rotational drive is also transferred from the cogwheel 16 to the cylinder $S_1$ through the cogwheel 18, which cogwheel 18 is in contact with the cogwheel 26, which in turn is in contact with cogwheel 27 that surrounds a shaft $a_1$ of the drying cylinder $S_1$. The cogwheel 27 comprises inner teeth or grooves 28 which are operationally connected with teeth or grooves 30 on the intermediate bushing 29 that surrounds the shaft $a_1$. The intermediate bushing 29 comprises inner teeth or grooves 31 which are in contact with the teeth or grooves 33 on the drive ring 32 on the shaft $a_1$ of the drying cylinder $S_1$. Thus, in a manner similar to the case of the cylinder $S_2$, by means of the intermediate bushing 29, a floating connection or coupling is formed between the driven drying cylinder $S_1$ and the gearbox 10. In an alternative embodiment, the teeth or grooves 33 may be fitted directly on the shaft $a_1$ instead of providing a separate drive ring. The drive ring 32 is stationarily mounted by means of a key and/or a press fitting on the shaft $a_1$ of the drying cylinder $S_1$. The shaft of the cogwheel 18 is denoted by $18b$ and its bearings which support the shaft $18b$ for rotation are denoted by reference numerals $18a_1$ and $18a_2$. Similarly, the shaft of the cogwheel 26 that is in contact with cogwheel 18 is denoted by $26b$ and its rotational bearings are denoted by $26a_1$ and $26a_2$. The bearings of the cogwheel 27 which enable rotation thereof are denoted by reference numerals $27a_1$ and $27a_2$. Between the intermediate bushing 21,29 and the outside cogwheel and between the intermediate bushing and the inner shaft or the drive ring connected with the shaft, there may be a groove-groove, groove-tooth, or a tooth-tooth coupling.

Figure 5:
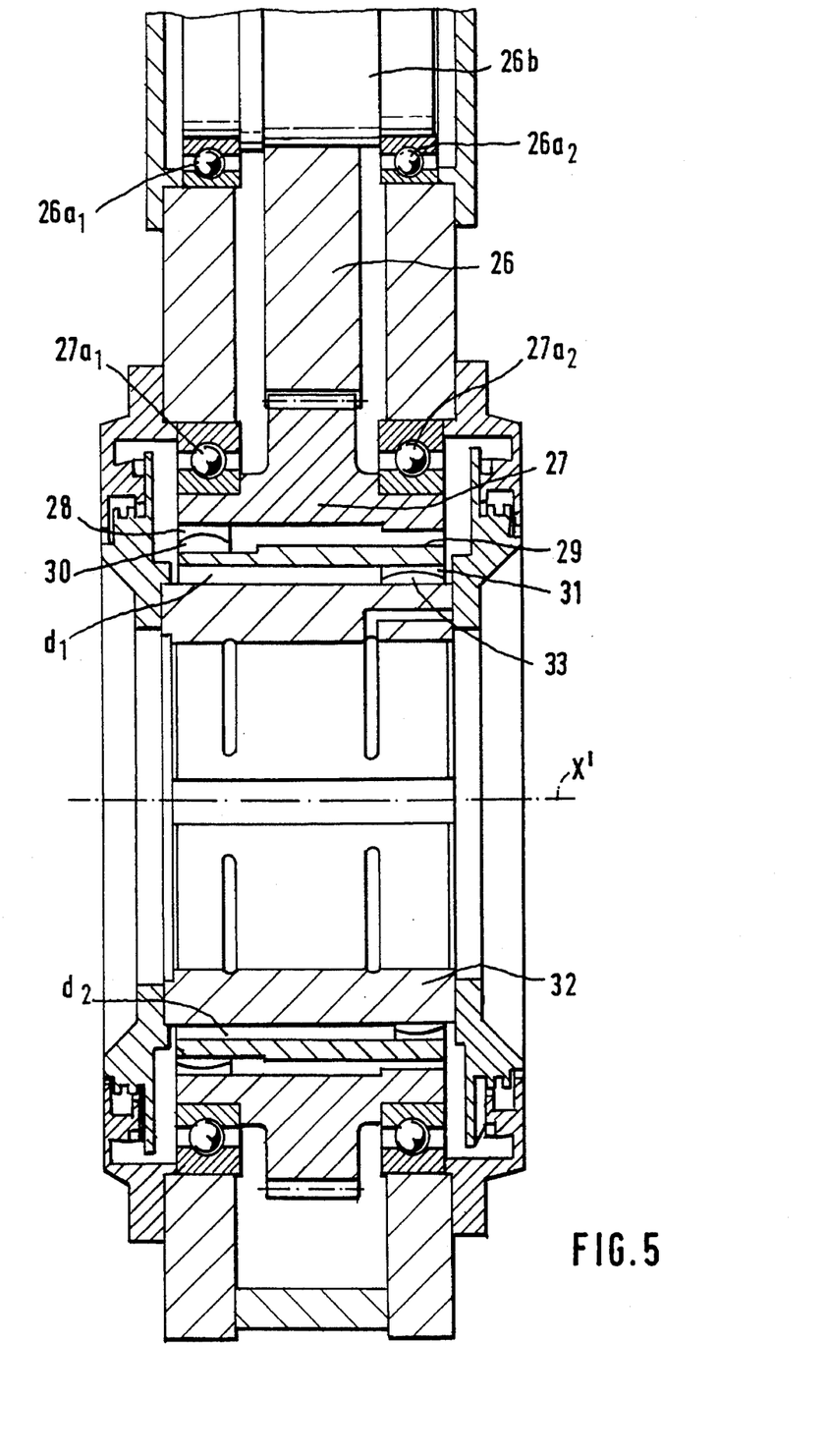
FIG. 5 shows a crowned tooth form, which is preferably used in the coupling between an intermediate bushing and a cogwheel as well as in the coupling between an intermediate bushing and a drive ring as one tooth form in a pair of teeth.

FIG. 5 is an enlarged view of the lower floating construction in the gearbox, which construction is similar to the upper floating construction. The rotation drive is passed from the cogwheel 26 to the cogwheel 27, which surrounds the shaft $a_1$ of the drying cylinder (not shown in this figure). Inside the cogwheel 27, there is an intermediate bushing 29, which also surrounds the shaft $a_1$. At one end or side of the intermediate bushing 29, there is a groove and/or tooth coupling with the cogwheel 27, and at the other end or side, and on an opposite face, there is a groove or tooth coupling with the drive ring 32 surrounding the shaft $a_1$.

As shown in FIG. 5, between the intermediate bushing 29 and the cogwheel 27, there is a gap $d_2$ at all locations except in the tooth coupling, and similarly there is a gap $d_1$ between the drive ring 32 and the intermediate bushing 29 at all locations except in the tooth or groove coupling. In a preferred embodiment of the invention, the intermediate bushing 29 comprises an inside straight toothing at one end and an outside crowned toothing 30 at the other end. The cogwheel 27 which surrounds the intermediate bushing 29 comprises a straight toothing 28 that is in engagement with crowned toothing 30. Correspondingly, the drive ring 32 placed inside the intermediate bushing 29 comprises a crowned toothing 33, which is in engagement with the straight inside toothing 31 in the intermediate bushing 29. In a crowned toothing 30,33, the top face of the tooth is curved and comprises a higher tooth form in the middle than at the ends of the tooth.

Figure 6:
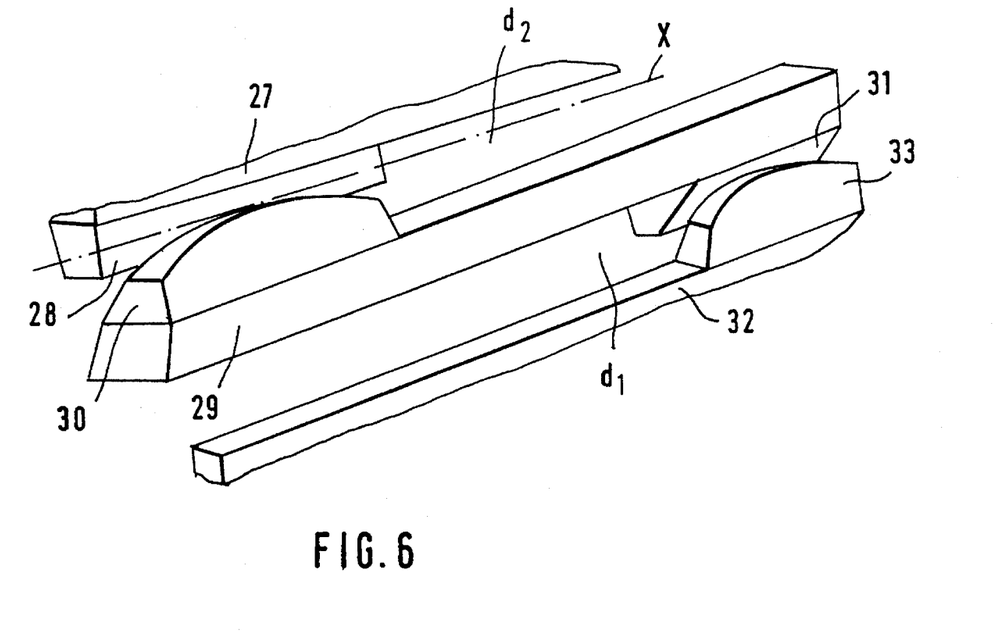
FIG. 6 is an enlarged view of a preferred tooth construction used in the coupling between an intermediate bushing and a cogwheel and in the coupling between an intermediate bushing and a drive ring.

FIG. 6 illustrates the preferred tooth construction described above. The intermediate bushing 29 comprises a crowned toothing 30 at one end and a straight toothing 31 at the other, opposite end. With the toothing 30, the straight inside toothing 28 on the cogwheel 27 is in engagement, and the toothing 31 is in engagement with the outer crowned toothing 33 on the drive ring 32.

The examples provided above are not meant to be exclusive. Many other variations of the present invention would be obvious to those skilled in the art, and are contemplated to be within the scope of the appended claims. For example, other specific coupling arrangements of two engagement surfaces of adjacent cogwheels, other than a groove-groove, groove-tooth, or a tooth-tooth coupling described above, may be utilized.

I claim:

1. A combination of first and second cylinders supported on a foundation and having first and second shafts, respectively, and a gearbox coupled to said first and second cylinders, comprising a box frame having an interior, drive means for providing a rotation force to said first and second cylinders, said drive means including a third shaft extending from an exterior of said box frame into the interior of said box frame, a first cogwheel coupled to said third shaft and being rotated upon rotation of said third shaft, second and third cogwheels each engaging with said first cogwheel and rotatively coupled to said first and second cylinders, respectively, such that rotation of said first cogwheel causes rotation of said second and third cogwheels and thus said first and second cylinders, means for connecting said box frame to the foundation to fix said box frame in a stationary position with respect to the foundation such that a load arising from the weight of said gearbox is transferred to the foundation through said box frame, and means for providing a floating coupling between said first and second shafts of said first and second cylinders and said gearbox which permits changes in the angle between an axis of said first and second shafts of said first and second cylinders and said gearbox such that torsion arising from faults in directions of said first and second shafts of said first and second cylinders is not transferred from said first and second cylinders to said gearbox or from said gearbox to said first and second cylinders.

2. The gearbox of claim 1, further comprising a fourth cogwheel mounted on said third shaft, a fourth shaft having a fifth cogwheel mounted thereon, said fifth cogwheel engaging with said fourth cogwheel, said first cogwheel being mounted on said fourth shaft, a sixth cogwheel surrounding said first shaft of said first cylinder, rotation drive being transferred from said third shaft of said drive means to said first cylinder via said fourth cogwheel engaging with said fifth cogwheel to rotate said fourth shaft and thus said first cogwheel causing rotation of said second cogwheel, said sixth cogwheel and said first cylinder, a seventh cogwheel surrounding said second shaft of said second cylinder, and an eighth cogwheel engaging with both said third cogwheel and said seventh cogwheel, rotation drive being transferred from said third shaft of said drive means to said second cylinder via said fourth cogwheel engaging with said fifth cogwheel to rotate said fourth shaft and thus said first cogwheel causing rotation of said third cogwheel, said eighth cogwheel, said seventh cogwheel and said second cylinder, said means for providing a floating coupled being arranged between said first and second shafts of said first and second cylinders and said gearbox.

3. The gearbox of claim 2, wherein said means for providing a floating coupling comprise an intermediate bushing arranged around each of said first and second shafts of said first and second cylinders and in an interior of said sixth and seventh cogwheels surrounding said first and second shafts of said first and second cogwheels, respectively, said sixth and seventh cogwheels having an inner surface and said intermediate bushing having an outer surface, said inner surface of said sixth and seventh cogwheels and said outer surface of a respective one of said intermediate bushings having cooperating parts such that between said respective intermediate bushing and each of said sixth and seventh cogwheels, a coupling is formed through said cooperating parts, said intermediate bushings having an inner surface and each of said first and second shafts of said first and second cylinders having an outer surface, said inner surface of each of said intermediate bushings and said outer surface of said first and second shafts of said first and second cylinders having cooperating parts such that between each of said intermediate bushings and a respective one of said first and second shafts of said first and second cylinders, a coupling is formed through said cooperating parts.

4. The gearbox of claim 2, wherein said means for providing a floating coupling comprise an intermediate bushing arranged around each of said first and second shafts of said first and second cylinders and in an interior of said sixth and seventh cogwheels surrounding said first and second shafts of said first and second cogwheels, respectively, said intermediate bushings having an inner surface, said sixth and seventh cogwheels having an inner surface and said intermediate bushing having an outer surface, said inner surface of said sixth and seventh cogwheels and said outer surface of a respective one of said intermediate bushings having cooperating parts such that between said respective intermediate bushing and said sixth and seventh cogwheels, a coupling is formed through said cooperating parts, and a drive ring mounted on each of said first and second shafts of said first and second cylinders, said drive rings having an outer surface, said outer surface of each of said drive rings and said inner surface of a respective one of said intermediate bushings having cooperating parts such that between each of said drive rings and a respective one of said intermediate bushings, a coupling is formed through said cooperating parts.

5. The gearbox of claim 1, wherein the foundation includes a bottom plate, further comprising bearings coupled to said first and second shafts, and vertical beams coupled to said bearings and said bottom plate for supporting said bearings such that the weight of said first and second cylinders is transferred through said bearings to the foundation.

6. The gearbox of claim 4, wherein said cooperating parts of said outer surface of the respective one of said intermediate bushings and said inner surface of said sixth and seventh cogwheels comprise a crowned toothing at a first end of said outer surface of said intermediate bushings and a straight toothing on said inner surface of said sixth and seventh cogwheels, said cooperating parts of outer surface of each of said drive rings and said inner surface of a respective one of said intermediate bushings comprising an inner straight toothing at a second end of said outer surface of said intermediate bushings opposite to said first end and a crowned outside toothing on a respective one of said drive rings, and wherein on said outer surface of said intermediate bushings, a gap is defined between said intermediate bushings and a respective one of said sixth and seventh cogwheels except at the location of said crowned toothing of said intermediate bushings, and on said inner surface of said intermediate bushings, a gap is defined between said intermediate bushings and a respective one of said drive rings except at the location of said straight toothing of said intermediate bushings.

7. The gearbox of claim 1, further comprising bearings means coupled to said box frame for supporting said sixth and seventh cogwheels while enabling rotation thereof.

8. The gearbox of claim 1, wherein said connecting means comprise a plate mounted on the foundation and fastening means for coupling said box frame to the foundation through said plate.

9. A method for driving a pair of cylinders, comprising the steps of:

introducing rotational drive from a motor to a gearbox, distributing the rotational drive from the gearbox to both of the pair of cylinders, connecting the gearbox to a foundation to fix the gearbox in a stationary position with respect to the foundation, supporting each of the pair of cylinders via bearings on the foundation separately from the fixing of the gearbox with respect to the foundation, and coupling shafts of each of the pair of cylinders to the gearbox by means of floating couplings to permit faults of deflection and shift for the shafts of each of the pair of cylinders without torsion or strains being produced on the gearbox.

10. The method of claim 9, wherein the step of distributing the rotational drive from the gearbox to both of the pair of cylinders comprises the steps of arranging cogwheels in connection with shafts of each of the pair of cylinder and arranging a plurality of cogwheels in interconnecting relationship to transfer the rotational drive from one of the plurality of cogwheels which is driven by drive means to the remainder of the plurality of cogwheels including the cogwheels arranged in connection with the shafts of each of the pair of cylinders.

11. The gearbox of claim 1, wherein said box frame comprises a front plate, a rear plate and side plates extending between said front plate and said rear plate.

12. The gearbox of claim 1, wherein said connecting means comprise a plate and indirectly connect said box frame to the foundation through said plate.

13. The gearbox of claim 3, wherein said cooperating parts of said inner surface of said sixth and seventh cogwheels and said outer surface of the respective one of said intermediate bushings comprise alternating projections and recesses, and said cooperating parts of said inner surface of said intermediate bushings and said outer surface of the respective one of said first and second shafts of said first and second cylinders comprise alternating projections and recesses.

14. The gearbox of claim 4, wherein said cooperating parts of said inner surface of said sixth and seventh cogwheels and said outer surface of the respective one of said intermediate bushings comprise alternating projections and recesses, and said cooperating parts of said outer surfaces of said drive rings and said inner surface of a respective one of said intermediate bushings comprise alternating projections and recesses.

15. A combination of first and second cylinders supported on a foundation and having first and second shafts, respectively, and a gearbox coupled to said first and second cylinders, comprising a box frame having an interior, drive means for providing a rotation force to said first and second cylinders, said drive means including a third shaft extending from an exterior of said box frame into the interior of said box frame, a first cogwheel coupled to said third shaft and being rotated upon rotation of said third shaft, second and third cogwheels each engaging with said first cogwheel and rotatively coupled to said first and second cylinders, respectively, such that rotation of said first cogwheel causes rotation of said second and third cogwheels and thus said first and second cylinders, means for supporting said box frame in a stationary position on the foundation such that a load arising from the weight of said gearbox is transferred to the foundation through said box frame, means for providing a floating coupling between said first and second shafts of said first and second cylinders and said gearbox which permits changes in the angle between an axis of said first and second shafts of said first and second cylinders and said gearbox such that torsion arising from faults in directions of said first and second shafts of said first and second cylinders is not transferred from said first and second cylinders to said gearbox or from said gearbox to said first and second cylinders, a bottom plate fixedly mounted on the foundation, bearings coupled to said first and second shafts of said first and second cylinders, and vertical beams connected to said bearings and said bottom plate for supporting said bearings such that the weight of said first and second cylinders is transferred through said bearings to the foundation.

16. A combination of first and second cylinders supported on a foundation and having first and second shafts, respectively, and a gearbox coupled to said first and second cylinders, comprising a box frame having an interior, drive means for providing a rotation force to said first and second cylinders, said drive means including a third shaft extending from an exterior of said box frame into the interior of said box frame, a first cogwheel coupled to said third shaft and being rotated upon rotation of said third shaft, second and third cogwheels each engaging with said first cogwheel and rotatively coupled to said first and second cylinders, respectively, such that rotation of said first cogwheel causes rotation of said second and third cogwheels and thus said first and second cylinders, means for supporting said box frame in a stationary position on the foundation such that a load arising from the weight of said gearbox is transferred to the foundation through said box frame, means for providing a floating coupling between said first and second shafts of said first and second cylinders and said gearbox which permits changes in the angle between an axis of said first and second shafts of said first and second cylinders and said gearbox such that torsion arising from faults in directions of said first and second shafts of said first and second cylinders is not transferred from said first and second cylinders to said gearbox or from said gearbox to said first and second cylinders, a fourth cogwheel mounted on said third shaft, a fourth shaft having a fifth cogwheel mounted thereon, said fifth cogwheel engaging with said fourth cogwheel, said first cogwheel being mounted on said fourth shaft, a sixth cogwheel surrounding said first shaft of said first cylinder, rotation drive being transferred from said third shaft of said drive means to said first cylinder via said fourth cogwheel engaging with said fifth cogwheel to rotate said fourth shaft and thus said first cogwheel causing rotation of said second cogwheel, said sixth cogwheel and said first cylinder, a seventh cogwheel surrounding said second shaft of said second cylinder, an eighth cogwheel engaging with both said third cogwheel and said seventh cogwheel, rotation drive being transferred from said third shaft of said drive means to said second cylinder via said fourth cogwheel engaging with said fifth cogwheel to rotate said fourth shaft and thus said first cogwheel causing rotation of said third cogwheel, said eighth cogwheel, said seventh cogwheel and said second cylinder, said means for providing a floating coupled being arranged between said first and second shafts of said first and second cylinders and said gearbox and comprising an intermediate bushing arranged around each of said first and second shafts of said first and second cylinders and in an interior of said sixth and seventh cogwheels surrounding said first and second shafts of said first and second cogwheels, respectively, said sixth and seventh cogwheels having an inner surface and said intermediate bushing having an outer surface, said inner surface of said sixth and seventh cogwheels and said outer surface of a respective one of said intermediate bushings having cooperating parts such that between said respective intermediate bushing and each of said sixth and seventh cogwheels, a coupling is formed through said cooperating parts, said intermediate bushings having an inner surface and each of said first and second shafts of said first and second cylinders having an outer surface, said inner surface of each of said intermediate bushings and said outer surface of said first and second shafts of said first and second cylinders having cooperating parts such that between each of said intermediate bushings and a respective one of said first and second shafts of said first and second cylinders, a coupling is formed through said cooperating parts.

17. The gearbox of claim 16, wherein said cooperating parts of said inner surface of said sixth and seventh cogwheels and said outer surface of the respective one of said intermediate bushings comprise alternating projections and recesses, and said cooperating parts of said inner surface of said intermediate bushings and said outer surface of the respective one of said first and second shafts of said first and second cylinders comprise alternating projections and recesses.

18. A combination of first and second cylinders supported on a foundation an having first and second shafts, respectively, and a gearbox coupled to said first and second cylinders, comprising a box frame having an interior, drive means for providing a rotation force to said first and second cylinders, said drive means including a third shaft extending from an exterior of said box frame into the interior of said box frame, a first cogwheel coupled to said third shaft and being rotated upon rotation of said third shaft, second and third cogwheels each engaging with said first cogwheel and rotatively coupled to said first and second cylinders, respectively, such that rotation of said first cogwheel causes rotation of said second and third cogwheels and thus said first and second cylinders, means for supporting said box frame in a stationary position on the foundation such that a load arising from the weight of said gearbox is transferred to the foundation through said box frame, means for providing a floating coupling between said first and second shafts of said first and second cylinders and said gearbox which permits changes in the angle between an axis of said first and second shafts of said first and second cylinders and said gearbox such that torsion arising from faults in directions of said first and second shafts of said first and second cylinders is not transferred from said first and second cylinders to said gearbox or from said gearbox to said first and second cylinders, a fourth cogwheel mounted on said third shaft, a fourth shaft having a fifth cogwheel mounted thereon, said fifth cogwheel engaging with said fourth cogwheel, said first cogwheel being mounted on said fourth shaft, a sixth cogwheel surrounding said first shaft of said first cylinder, rotation drive being transferred from said third shaft of said drive means to said first cylinder via said fourth cogwheel engaging with said fifth cogwheel to rotate said fourth shaft and thus said first cogwheel causing rotation of said second cogwheel, said sixth cogwheel and said first cylinder, a seventh cogwheel surrounding said second shaft of said second cylinder, an eighth cogwheel engaging with both said third cogwheel and said seventh cogwheel, rotation drive being transferred from said third shaft of said drive means to said second cylinder via said fourth cogwheel engaging with said fifth cogwheel to rotate said fourth shaft and thus said first cogwheel causing rotation of said third cogwheel, said eighth cogwheel, said seventh cogwheel and said second cylinder, said means for providing a floating coupled being arranged between said first and second shafts of said first and second cylinders and said gearbox and comprising an intermediate bushing arranged around each of said first and second shafts of said first and second cylinders and in an interior of said sixth and seventh cogwheels surrounding said first and second shafts of said first and second cogwheels, respectively, said intermediate bushings having an inner surface, said sixth and seventh cogwheels having an inner surface and said intermediate bushing having an outer surface, said inner surface of said sixth and seventh cogwheels and said outer surface of a respective one of said intermediate bushings having cooperating parts such that between said respective intermediate bushing and said sixth and seventh cogwheels, a coupling is formed through said cooperating parts, and a drive ring mounted on each of said first and second shafts of said first and second cylinders, said drive rings having an outer surface, said outer surface of each of said drive rings and said inner surface of a respective one of said intermediate bushings having cooperating parts such that between each of said drive rings and a respective one of said intermediate bushings, a coupling is formed through said cooperating parts.

19. The gearbox of claim 18, wherein said cooperating parts of said inner surface of said sixth and seventh cogwheels and said outer surface of the respective one of said intermediate bushings comprise alternating projections and recesses, and said cooperating parts of said outer surfaces of said drive rings and said inner surface of a respective one of said intermediate bushings comprise alternating projections and recesses.

20. The gearbox of claim 18, wherein said cooperating parts of said outer surface of the respective one of said intermediate bushings and said inner surface of said sixth and seventh cogwheels comprise a crowned toothing at a first end of said outer surface of said intermediate bushings and a straight toothing on said inner surface of said sixth and seventh cogwheels, said cooperating parts of outer surface of each of said drive rings and said inner surface of a respective one of said intermediate bushings comprising an inner straight toothing at a second end of said outer surface of said intermediate bushings opposite to said first end and a crowned outside toothing on a respective one of said drive rings, and wherein on said outer surface of said intermediate bushings, a gap is defined between said intermediate bushings and a respective one of said sixth and seventh cogwheels except at the location of said crowned toothing of said intermediate bushings, and on said inner surface of said intermediate bushings, a gap is defined between said intermediate bushings and a respective one of said drive rings except at the location of said straight toothing of said intermediate bushings.

* * * * *